United States Patent
Ticehurst (10) Patent No.: US 12,306,847 B2
(45) Date of Patent: May 20, 2025

(54) AGGREGATING LARGE DATABASE CHANGES IN EXTRACT, TRANSFORM, LOAD (ETL) ENVIRONMENTS

(71) Applicant: Unisys Corporation, Blue Bell, PA (US)

(72) Inventor: John Lesley Ticehurst, Sydney (AU)

(*) Notice: Subject to any disclaimer, the term of this patent is extended or adjusted under 35 U.S.C. 154(b) by 0 days.

(21) Appl. No.: 17/243,636

(22) Filed: Apr. 29, 2021

(65) Prior Publication Data

US 2022/0350813 A1 Nov. 3, 2022

(51) Int. Cl.
*G06F 16/25* (2019.01)
*G06F 16/23* (2019.01)

(52) U.S. Cl.
CPC ........ *G06F 16/254* (2019.01); *G06F 16/2379* (2019.01)

(58) Field of Classification Search
CPC ........................... G06F 16/254; G06F 16/2379
USPC ....................................................... 707/602
See application file for complete search history.

(56) References Cited

U.S. PATENT DOCUMENTS

| | | | | |
|---|---|---|---|---|
| 6,032,158 | A * | 2/2000 | Mukhopadhyay | G06F 16/23 |
| 2002/0165724 | A1* | 11/2002 | Blankesteijn | G06F 16/2308 |
| | | | | 705/1.1 |
| 2004/0030703 | A1* | 2/2004 | Bourbonnais | G06F 16/2379 |
| 2009/0177671 | A1* | 7/2009 | Pellegrini | G06F 9/5038 |
| 2009/0299969 | A1* | 12/2009 | Le | G06F 16/2477 |
| 2010/0049715 | A1* | 2/2010 | Jacobsen | G06F 16/27 |
| | | | | 707/704 |
| 2013/0173529 | A1* | 7/2013 | Erla | G06F 16/254 |
| | | | | 707/602 |
| 2014/0025645 | A1* | 1/2014 | Brown | G06F 16/25 |
| | | | | 707/E17.005 |
| 2016/0364399 | A1* | 12/2016 | Konik | G06F 16/2358 |
| 2017/0011104 | A1* | 1/2017 | Hyde | G06F 16/2365 |
| 2017/0068595 | A1* | 3/2017 | Nautiyal | G06F 16/254 |
| 2017/0242887 | A1* | 8/2017 | Zhao | G06F 9/5083 |
| 2018/0095952 | A1* | 4/2018 | Rehal | G06F 16/27 |
| 2019/0095080 | A1* | 3/2019 | Clifford | G06F 16/24575 |
| 2019/0102411 | A1* | 4/2019 | Hung | G06N 5/025 |
| 2019/0171650 | A1* | 6/2019 | Botev | G06F 16/273 |
| 2020/0026710 | A1* | 1/2020 | Przada | G06N 20/00 |
| 2020/0293503 | A1* | 9/2020 | P | G06N 5/04 |

(Continued)

OTHER PUBLICATIONS

Gunnar Morling, Building Audit Logs with Change Data Capture and Stream Processing, Jan. 10, 2019, redhat, all pages. (Year: 2019).*

(Continued)

*Primary Examiner* — Amy Ng
*Assistant Examiner* — Antonio J Caiado
(74) *Attorney, Agent, or Firm* — SHOOK, HARDY & BACON L.L.P.

(57) ABSTRACT

Systems and methods for implementing a federated database system are presented herein. One or more source databases may store changed data to a target database. Each update of a record in a source database can result in an audit log entry written with the before and after image, a timestamp, and an identifier for the log entry. Using the audit log, the database implementation herein can consolidate updates to any record for a batching event to be processed in an Extract, Transform, and Load (ETL) process for export of updates to the target database.

19 Claims, 8 Drawing Sheets

(56) References Cited

U.S. PATENT DOCUMENTS

2020/0301947 A1* 9/2020 Botev .................. G06F 16/215
2020/0320059 A1* 10/2020 Kumar .................. G06F 16/27

OTHER PUBLICATIONS

Ahmad Yaseen, Change Data Capture for auditing SQL Server, Mar. 18, 2019, SQLShack, all pages. (Year: 2019).*

* cited by examiner

AGGREGATING LARGE DATABASE CHANGES IN EXTRACT, TRANSFORM, LOAD (ETL) ENVIRONMENTS

BACKGROUND

Many large corporations, for example, banks or insurance companies, have regular large batch data processing events (e.g., monthly, quarterly, yearly). In these events, high volumes of database updates can occur. A target database may propagate database changes from multiple environments. Batch updating of the source database can flood the target data stores with potentially many intermediate record changes for many records. For instance, an individual record may be updated multiple times during a batch processing event. However, the user is really only interested in the final state of each individual record that has been updated during the processing event. Many companies choose to refresh their complete data store targets rather than apply all of these intermediate database updates. This refresh or change processing can lead to complicated synchronization issues, applications being temporarily offline, and, potentially, significant time lags between the accuracy of data between the source database and the target data stores.

SUMMARY

In accordance with the present disclosure, the above and other issues are addressed by a database change aggregation method and system provided in an extract, transform, load (ETL) environment which reduces the number of transactions that are required to be propagated across networks and written into federated databases distributed remotely from one another. By aggregating transactions appearing in audit logs, In a first aspect, a method includes starting an extract, transform, load (ETL) process for a federated database system, the ETL process used for migrating changes to records in a source database to a target database. The method includes parsing an audit log including audit log entries for each of a plurality of changes to a plurality of records in the source database at a CDC reader to aggregate updates to the plurality of database records in an aggregation table, the aggregation table having an entry for each record changed by the plurality of changes. The method also includes sending, to the target database, an update of each of the plurality of records without transmitting each of the audit log entries to the target database in the federated database system.

In a second aspect, an ETL system executable local to a source database for communicating updates from the source database to a target database in a federated database system is provided. The ETL system includes a memory storing a CDC reader and an aggregation table, and a processor in communication with the memory, wherein the processor executes instructions stored in the memory, which cause the processor to execute a method. The method includes, parsing an audit log including audit log entries for each of a plurality of changes to a plurality of records in the source database at the CDC reader to aggregate updates to the plurality of database records in the aggregation table, the aggregation table having an entry for each record changed by the plurality of changes, and sending, to the target database, an update of each of the plurality of records without transmitting each of the audit log entries to the target database in the federated database system.

In a third aspect, a non-transitory computer readable medium having stored thereon instructions is disclosed. When executed by a processor, the instructions cause the processor to execute a method comprising: starting an extract, transform, load (ETL) process for a federated database system, the ETL process used for migrating changes to records in a source database to a target database; parsing an audit log including audit log entries for each of a plurality of changes to a plurality of records in the source database at a CDC reader to aggregate updates to the plurality of database records in an aggregation table, the aggregation table having an entry for each record changed by the plurality of changes; and sending, to the target database, an update of each of the plurality of records without transmitting each of the audit log entries to the target database in the federated database system.

DETAILED DESCRIPTION

Embodiments of the present disclosure will be described in connection with one or more databases, and, in accordance with at least some situations or configurations, a source database and a target database. Most data managers uniquely identify records by one of two ways, via a record identifier or by an application defined unique primary key. Each update of a record typically results in an audit/log entry written with the before and after image, a timestamp, and an identifier for the log entry.

The implementations here outline a solution to the issues presented above whereby only the "last", or aggregated, update to any record for a batching event is processed in the Extract, Transformation, and Load (ETL) process. The processing and export of only this "last" update removes the need to take down any applications and perform database refreshes of the target data stores. Further, this new process differs from traditional Change Data Capture (CDC) paradigms. With traditional CDC paradigms, every update to a record is captured or, in high volume cases, it could be more efficient to reload the entire table into the data store when batch processing is complete.

In contrast, the implementations herein can capture the before and after image of the unique record after all updates to this record have been posted. This image capture reduces the amount of processing required to synchronize the target data store. Only addressing the records that were updated, and not the complete set of records comprising the source table, also removes any need to reload the entire table once the batch process is complete.

There may also be computation savings with the reload time because only the active records (e.g., records that have actually been changed) may be processed; any data not touched by the batch processing may not need to be processed by the ETL process. Further savings can be realized by identifying source tables that lend themselves to this type of processing and only applying this processing to that stream of particular source tables. Source tables that are suitable for this type of processing have many records that are updated multiple times.

CDC mechanisms serialize all updates to an audit log entry. The changes can appear in the audit log simply as the before image and the after image of the record for each record transaction. These audit log entries may then form an aggregation table and the after images can update the target data with the new value(s). Unique audit markers can bookend the start and completion of the large batch runs. These unique Audit markers may be independent of any transform operations and may not affect further changes to the extracted record.

The "aggregation table" can be any in-memory mechanism or database table that can hold the latest version of a source record. This record can be keyed with the Record Identifier, and include meta-data, for example, the initiating command type (e.g., insert, update, delete, etc.), a Timestamp, the before image of the record, the after image of the record, etc. The audit log can include a logical Start of Batch (SOB) and End of Batch (EOB) marker on the audit log. This audit log, with the SOB and EOB, may be interpreted as a special source table that has meaning to the CDC Reader, or the CDC reader can be forced into, and out of, aggregation mode through an alternative process. Once the SOB marker has been encountered and until the EOB marker is read, the initial DML Operations (e.g., insert, update, delete, etc.) can be recorded in the record metadata. If the initial DML operation was a delete, for example, then the before image can contain the record that was deleted and the after image will be blank. Updates to records may result in the inserted data remaining as the before image and all subsequent updates can be reflected in the after image.

When the Aggregation table is complete and ready for processing, it is ordered by participating table and timestamp. This aggregation table processing can be scaled out amongst as many processors or servers that are available, providing a robust 'scale out' methodology to load the data store as quickly as possible and further reducing synchronization time. Data integrity with any participating table's foreign key dependencies can be preserved by processing these tables in dependency order.

Tables with no dependencies (no foreign keys) can be processed first;
Tables with dependencies only in the first set of tables can be processed second;
Tables with dependencies only in the first or second sets of tables can then be processed and so on.

In the event of a failure, the aggregation table can be recovered to a certain point in time, depending on the in-memory and persistence features available for this aggregation table. If the records in the target data store are available to the ETL process, then the before image of the records in the aggregated table can be compared to the value of the record in the target data store to determine changes.

Figure 1A:
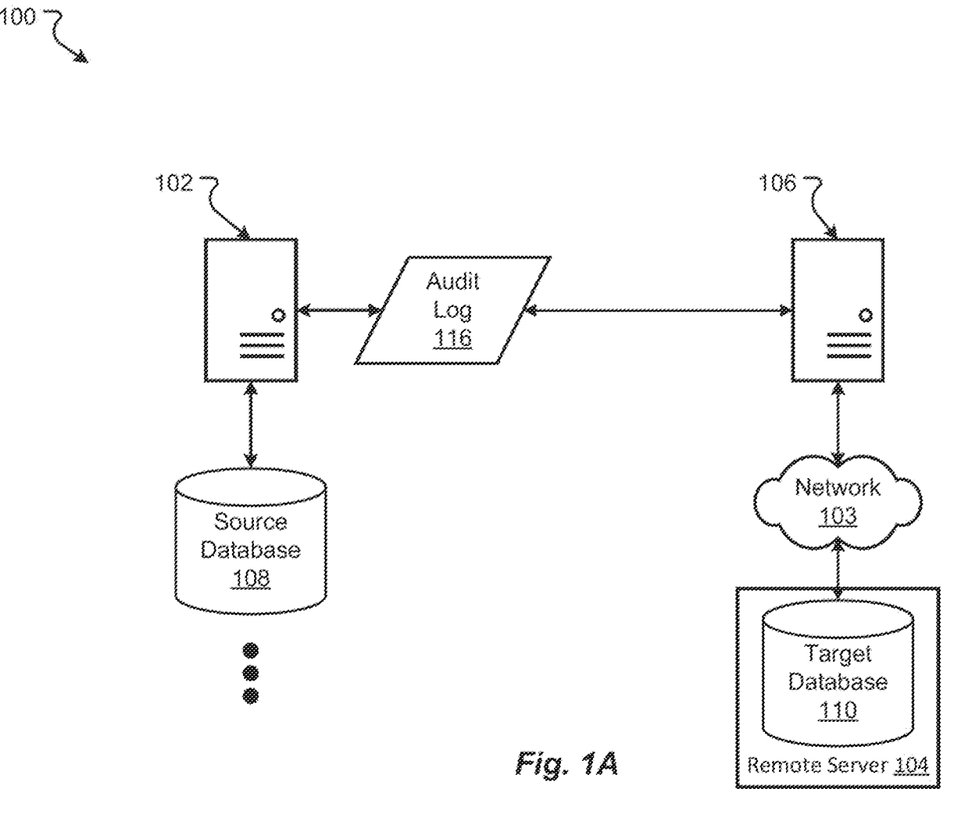
FIG. 1A depicts an environment, in accordance with embodiments of the present disclosure.

An environment 100 including one or more database systems may be as shown in FIG. 1. The database systems, shown in FIG. 1, may comprise a federated database system including one or more source databases 108, in communication, over a network 103, with a virtual or target database system 104. The database systems 102/104 may be as described hereinafter in conjunction with FIGS. 5 and 6. The network 103 may also be as described hereinafter with conjunction FIGS. 5 and 6.

The database systems 102/104 can include database management systems (DBMS). The source DBMS can be in communication with a source database 108, and a target DBMS executable on the database system 104 can be in communication with a target database 110. There may be more than one source database 108. Each source database 108 may store data under different schema, use different protocols, etc. As such, each source database change may need to be translated or transformed to be stored at the target database 110.

In instances where source database system 102 is exporting data to a target database system 104, the source database system 102 may utilize an Extract, Transform, and Load (ETL) system 106. The ETL system 106 may be implemented as part of the database system 102 in whole or in part. As shown in FIG. 1A, the ETL system 106 is communicatively connected to the database system 102. In preferred embodiments, the ETL system 106 is local to the database system 102, and is used to export data from the database system 102 to the target database 110 in a desired format.

Notably, in the context described herein, the source database system 102 may be configured for operation in a Change Data Capture (CDC) paradigm in which records are updated frequently, and record updates must be replicated to the target database 110. In such an instance, in traditional CDC methods, an audit log 116 may be parsed by a CDC tool, and each audit log transaction may then be exported to the target database 110 via the ETL system 106.

As noted above, where a large number of changes are made to a relatively smaller number of records, such CDC update processes can be highly inefficient. That is, the ETL tool may transform many audit log transactions for transmission over network 103. Where the network 103 is a public network having limited bandwidth between the source database system 102 and remote server 104 hosting the target database 110, this can take significant time. In an example observed scenario in which bank records are synchronized between a source database and a remote target database, a synchronization of 600,000 record update events spread across 200,000 distinct records required 28 minutes to perform. As noted above, given the likely larger scale of typical updates, improvements in performance are desired.

Figure 1B:
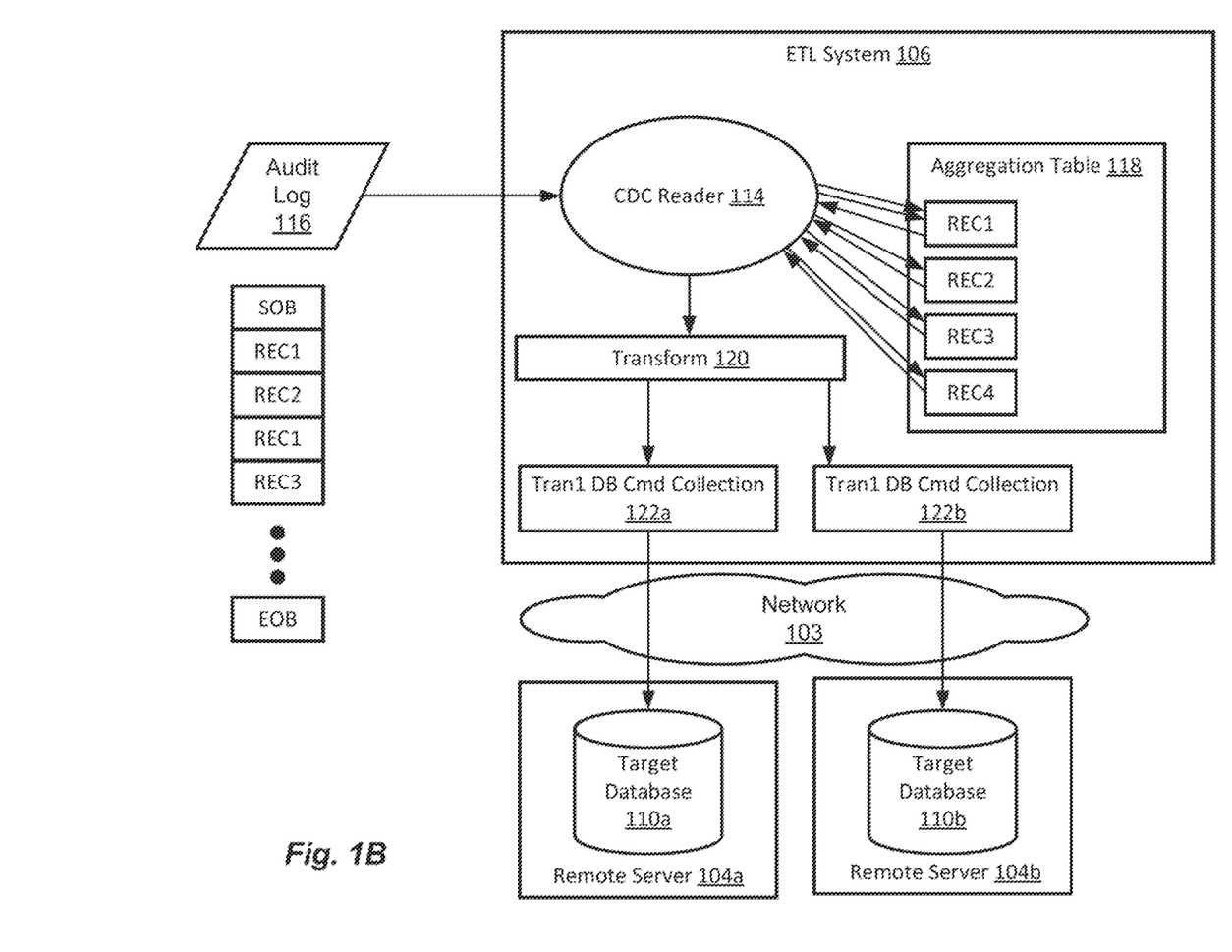
FIG. 1B depicts an ETL tool useable within the environment of FIG. 1A, in accordance with embodiments of the present disclosure.

Referring to FIG. 1B, a more detailed depiction of the ETL system 106 is shown in which aspects of the present disclosure may be implemented. In the example shown, the ETL system 106 manages export of records from the source database system 102 for delivery within a federated database system, to a target database 110. As noted above, although the ETL system 106 is shown as being separate from the source database system 102, in particular embodiments, the ETL system 106 may be located proximate to or on the same system as the source database system 102. In some examples, the ETL system 106 is proximate to but executes on a separate computing system or cluster as compared to the source database system 102, and updates from the audit log 116 are published to the ETL system 106 via a streaming data service, such as Apache Kafka. Other implementations are possible as well.

In the example shown, the ETL system 106 includes a CDC reader 114, which receives records from the audit log 116. The CDC reader 114 can determine changes in the records of the database 108, and communicate those changes from database management system 102 to the database management system remote databases 110. The CDC reader 114 may also be operable to read an audit log 116 produced from changes that are made to data in the source database 108. The audit log 116 may be as described in conjunction with FIG. 2a. Information from the audit log 116 may be sent to the target database 110 via a managed process using aggregation table 118. In general, the aggregation table 118 receives and aggregates record updates that are reflected in audit log 116 over a predetermined amount of time. For example, a predetermined amount of time may be defined in the audit log via a logical Start of Batch (SOB) and End of Batch (EOB) marker; records between such markers may be aggregated within the aggregation table, with multiple changes to a single record being made relative to a single entry in the aggregation table 120. In the example shown in FIG. 1B, two updates to REC1 are made, although a single copy of that record is maintained in the aggregation table 118. An implementation of the aggregation table 118 may be as described in conjunction with FIG. 2B Upon completion of the batch (as designated by an EOB marker), the CDC reader 114 may pass the records in the aggregation table 118 to an ETL transform component 120. The ETL transform component 120 may transform the records received from the aggregation table 118 for export to a target database 110. A transmission service 122 may be used to manage transmission of records to each individual target database to which those records should be synchronized. In the example shown two different transmission services 122a-b are shown, which transmit data to two different target databases 110a-b, managed at two different remote servers 104a-b. Although in the example shown to such transmission services, and databases, are shown, it is recognized that one or more such remote databases, and associated services, may be utilized.

Accordance with the arrangement seen in FIG. 1B, it is recognized that the transmission services 122 are able to manage transmission of data via network 103, which may have limited throughput due to the remote servers 104 being remote from the ETL system 106, and/or the network having limited bandwidth. Because the CDC reader 114 only provides to the ETL transform component 120 a single copy of each record that has been updated within a batch, fewer records are required to be transformed, and fewer records are required to be transmitted via the network 103 to a target database 110. This significantly improves performance of the ETL and export process.

Although, in the embodiment shown, a single aggregation table 118 is depicted, it is recognize that more than one aggregation table 118 may be used. For example, depending on a size of the audit log 116 it may be advisable to maintain a local and/or a remote copy of the aggregation table 118, since a separate record must be maintained within the aggregation table 118 for each unique record that is included in the audit log 116 while the entire audit log 116 is being processed. Because the aggregation table 118 is generally maintained in memory of the ETL system 106, depending on a size of the aggregation table 118 it may be resource intensive to require the entire aggregation table 118 to be maintained at one location. Accordingly, external, easily accessible memories may be used as well where the performance trade-off of a separate memory is worthwhile given that the aggregation table 118 may otherwise exhaust local memory availability of the ETL system 106.

Figure 2A:
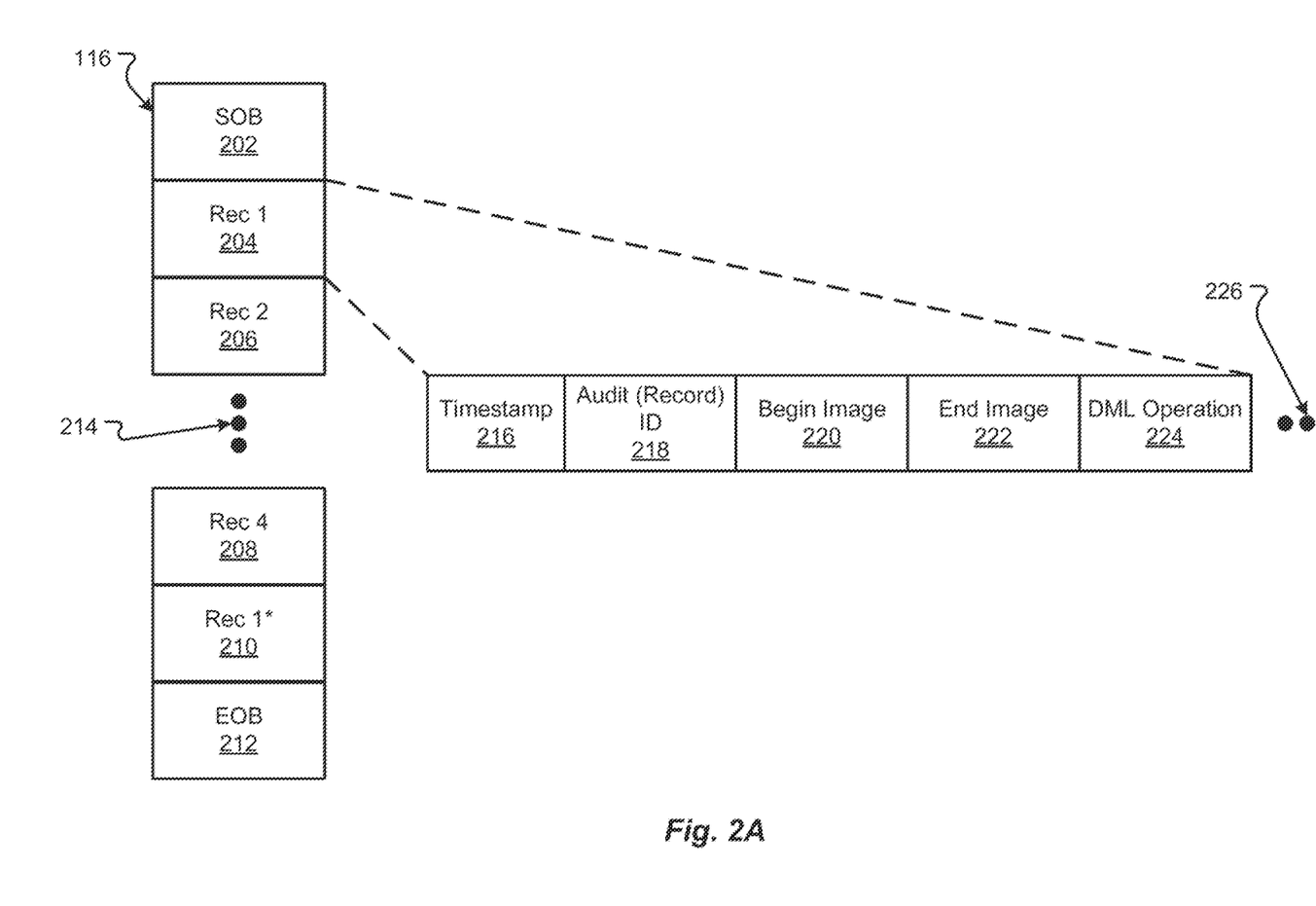
FIG. 2A depicts a block diagram of a data structure, in accordance with embodiments of the present disclosure.

An implementation of the audit log 116 may be as shown in FIG. 2A. The audit log 116 can include one or more changes to one or more records provided as change information 204, 206, 208, 210, etc. There may be more or fewer changes to the various records in the database 108 than that shown in FIG. 2A, as represented by ellipses 214. Each of the different record changes 204-210 can include various information describing the change. For example, the record changes can include a timestamp 216, an audit and/or record identifier (ID) 218, a begin image 220, an end image 222, and one or more DML operations 224. There may be more or fewer fields in the record change information 204-210, as represented by ellipses 226.

The timestamp information 216 can include a date and/or a time, representing the moment when the record change was either made or written to the database 108. The timestamp 216 can order record changes chronologically and can order the changes to the same record in the audit log 116.

The audit (record) ID 218 can be an ID that can uniquely identify this record and/or change to the record. The audit ID 218 can include a numeric ID, an alphanumeric ID, a globally unique ID (GUID), or some other type of ID. The ID can allow the database systems 102, 110 to determine which record is changed and/or which change to that record is being recorded in the audit log 116.

The begin image 220 can include the image of the record before the change(s) had been made and recorded in the audit log 116. The begin image 220 can include the state of data associated with the record before any change.

The end image 222 can include an image of the record after the change(s) was made as provided in the record information 204-210. The end image 222 can include any information that is changed or can include the entire changed record.

The data manipulation language (DML) operation field 224 can record any DML operation that may be conducted on the record. For example, the operations can include SELECT, INSERT, UPDATE, DELETE, etc. operations. These DML operations 224 provide information to the aggregation table 118 to indicate how the data change should be handled.

The audit log may also include a start of batch (SOB) field 202 and/or an end of batch (EOB) field 212. The SOB 202 and EOB 212 can indicate the beginning and end of a series of record changes that are to be sent to the target database 110. The SOB 202 and EOB 212 can include a timestamp or an indicator, for example, one or more bits set to indicate the SOB 202 or EOB 212. The SOB 202 can indicate those changes made and/or not yet sent to the target database 110. Further, the EOB 212 can indicate a batch that may have some other type of association that may create one or more batches of record changes.

Figure 2B:
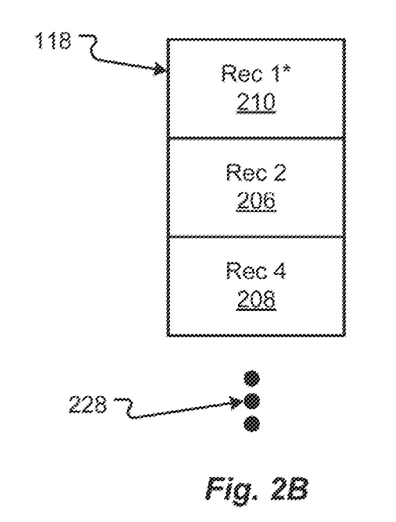
FIG. 2B depicts another block diagram of a data structure, in accordance with embodiments of the present disclosure.

An implementation of the aggregation table 118 may be as shown in FIG. 2B. The aggregation table 118 can be a consolidation of the changes as presented in the audit log 116. The aggregation table 118 can include only the last change made to each record in the set of changes in the audit log 116. For example, the audit log 116 show two changes are made to record 1 204, 210. However, the CDC reader 114 receives all such changes, and consolidates those changes in a single record in the aggregation table 118. In this way, the aggregation table 118 represents only the last change that needs to be recorded in the database 110 and eliminates the need for sending the previous or intermediary changes, for example, change 204, to the target database 110. Thus, the aggregation table 118 helps to eliminate the numerous changes to a single record.

The other changes may also be included in the aggregation table 118, for example, the record 2 change 206 and a record 4 change 208. There may be more or fewer changes within the aggregation table 118, as represented by ellipses 228. However, the changes only represent the last change to each record, and thus, the size of the aggregation table 118 is equivalent to the number of records changed in the batch (rather than the total number of changes), represented by the audit log 116. Each of the records changes 210, 206, 208, can include similar information 216 through 224 as described in the record change information in FIG. 2A. In some embodiments, less information than that shown in FIG. 2A may be presented in the aggregation table 118; for example, the aggregation table 118 may only include the DML operation 224, the end image 222, and the audit ID 218. In this way, only the end image information 222 may be sent, to further decrease the bandwidth used across network 103 to communicate changes from the source database 108 to the target database 110. The end image includes the information needed to make any updates to the record in the target database 110. Further, the DML operation 224 can indicate whether a record should be deleted or added was simply changed in the target database 110.

Figure 3:
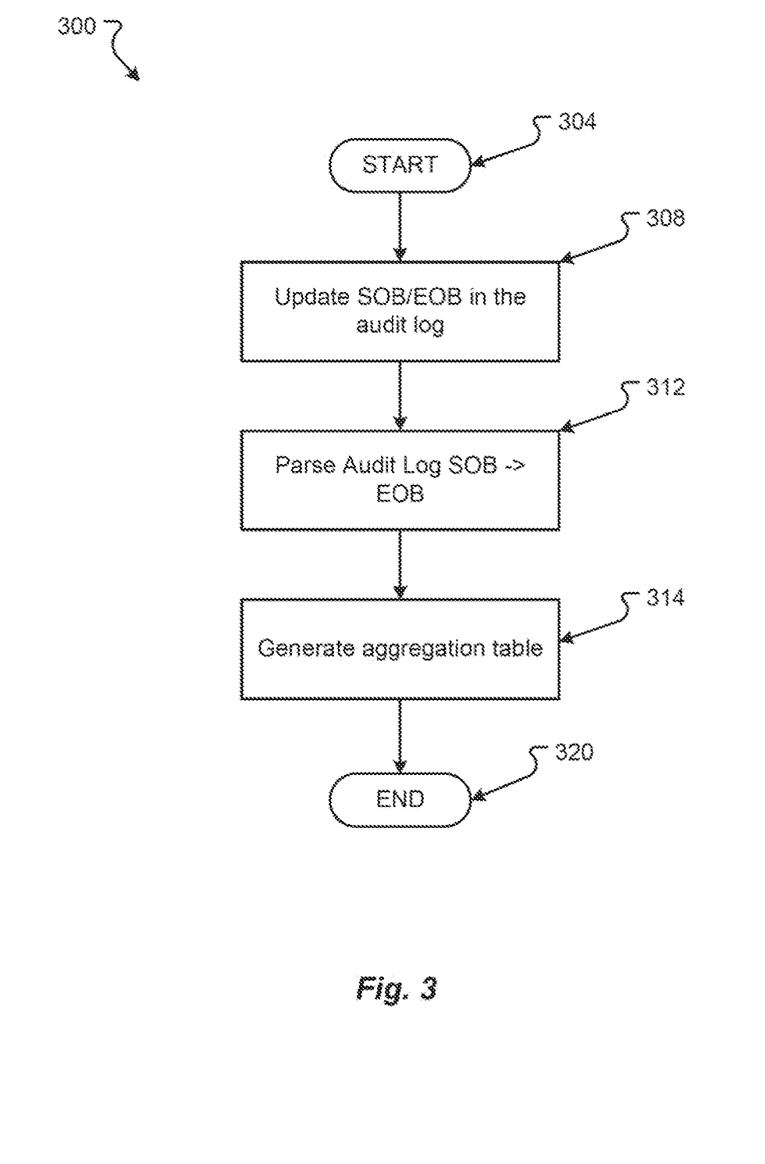
FIG. 3 depicts a first method for storing data, in accordance with embodiments of the present disclosure.

An implementation of a method 300, which may be as conducted by the database management system 102, on the one or more the source databases 108, may be as shown in FIG. 3. The method 300 can start with a start operation 304 and can end with an end operation 320. The method 300 can include more or fewer stages or can arrange the order of the stages differently than those shown in FIG. 3. The method 300 can be executed as a set of computer-executable instructions, executed by a computer system or processing component, and be encoded or stored on a storage medium. Further, the method 300 can be executed by a gate or other hardware device or component in an ASIC, a FPGA, a SOC, or other type of hardware device. Hereinafter, the method 300 shall be explained with reference to the systems, components, modules, software, data structures, etc., as described in conjunction with FIGS. 1-2B.

The database system 102 can start an ETL event at stage 304, via communication with the ETL system 106. In example embodiments, the CDC Reader 114 can generate or update an SOB 202 and an EOB 212 indicator in an audit log for a batch of records for which changes are to be sent to the target database 110, at stage 308. In alternative embodiments, the database system 102 itself may manage the SOB 202 and EOB 212, based on which records have previously been provided to the ETL system 106.

The audit log 116 may be created contemporaneously with any changes being recorded to the source database 108. For example, as the change to record 2 is made, the database system 102 can record information about that change in record information 206 and the audit log 116. In some implementations, the changes may be recorded but not assembled or consolidated into an audit log 116 until sometime thereinafter. Regardless of how the audit log 116 is created, that audit log 116 may then be used by the database system 102 to send information to the ETL system 106.

In example implementations, the SOB 202 may be generated at the beginning of the last ETL operation by the database system 102 or the CDC reader 114, for example, after previous changes were sent to the target database 110. In other implementations, the SOB 202 and EOB can be recorded before the data federation and after any changes have already been recorded to indicate what batch of record changes are being sent during a data federation. In other implementations, the EOB 212 can be created after the last record change 210, but sometime after the SOB 202 was recorded to indicate the batch. Regardless of the process used to create the SOB 202 and EOB 212, the SOB 202 and EOB 212 are recorded in the audit log 116.

The database system 102 may send audit log information or the entire audit log 116 to the ETL system 106. The ETL system, more specifically CDC reader 114, can read information or parse the audit log 116, at stage 312. Instances, the CDC reader 114 may parse the portion of the audit log 116 and write only the last entry for a given record in the aggregation table 118. This may occur, for example, in cases where the audit log includes an entire version of the updated record in the source database 106. In such instances, only the last record would be required to be propagated to a target database 110 by the ETL system 106, since all previous record updates would be reflected in that last record update. For example, the CDC reader 114 can determine the last change to record 1 was change 210. In other examples, each audit log entry causes a modification of a corresponding record entry in the aggregation table 118, which aggregates all updates to a given record.

In at least some implementations, the ETL system 106 may determine the last entry for record the database system 102, for example, the CDC reader 114 can determine the last entry for any one record in the audit log 116. Thus, the database system 102 can search for the audit ID 218, within each record, to determine similar records. Upon determining which IDs 218 are similar between the various records, the CDC reader 114 may then determine the last time stamp 216 within that set of records. Upon determining which record has the last time stamp, the CDC reader 114 indicates that record changes being the last record entry.

In the example shown, the CIX reader 114 will generate an aggregation table 118 from entries in the audit log between the SOB 202 and the EOB 212, at stage 314. In general, this includes the CDC reader 114 parsing the portion of the audit log between the SOB and the EOB, and creating a record in the aggregation table 118 for each unique record referenced in that portion of the audit log. In example embodiments, the CDC reader 114 determines the unique record based on a record ID. Again, the aggregation table 118 may be generated from an aggregation of all transactions associated with a given record, or may be based simply on a less transaction associated with the record, depending on the contents of the audit log 116.

In the example shown, the CDC reader 114 may then provide the contents of the aggregation table 118 to a transform component 120. The transform component 120 may transform the data from the aggregation table 118 into a format intended for a destination database, such as target database 110. One or more data transport handlers (e.g., transmission services 122) may be used to transmit the data over a network to a remote database, such as target database 110 for update.

In this way, only the last, or aggregate, change is sent over the network 103, such that only one change per record is required to be transmitted. This reduction in information sent over the network 103 greatly increases the speed with which the changes are reported from the audit log 116 and from the source database 108 to the target database 110. Further, only records that were changed in the audit log 116 may be communicated through the network 103 to the target database 110. This change greatly reduces the bandwidth needed to make changes or send changes to the network 103 and greatly reduces the workload on the target database 110.

Figure 4:
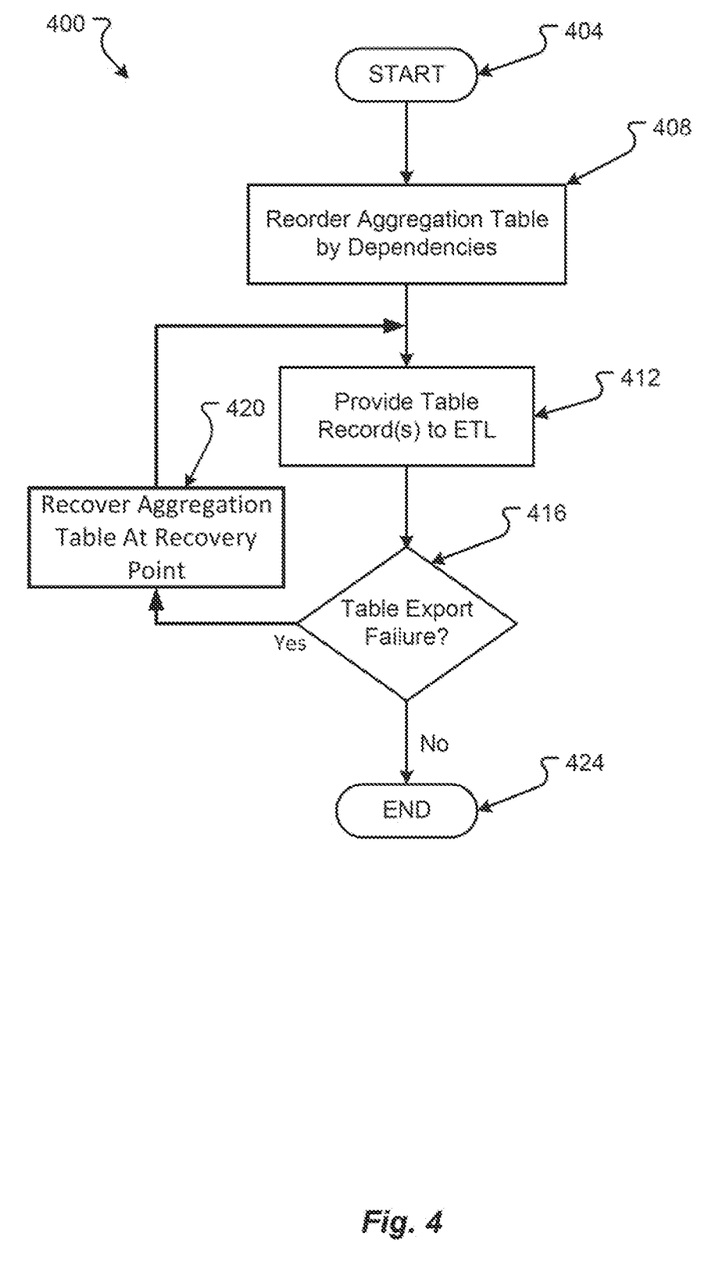
FIG. 4 depicts a second method for storing data, in accordance with embodiments of the present disclosure.

An embodiment or implementation of a method 400 for processing an aggregation table for export to an ETL service, may be as shown in FIG. 4. The method 400 can start with a start operation 404 and can end with an end operation 424. The method 400 can include more or fewer stages or can arrange the order of the stages differently than those shown in FIG. 4. The method 400 can be executed as a set of computer-executable instructions, executed by a computer system or processing component, and be encoded or stored on a storage medium. Further, the method 400 can be executed by a gate or other hardware device or component in an ASIC, a FPGA, a SOC, or other type of hardware device. Hereinafter, the method 400 shall be explained with reference to the systems, components, modules, software, data structures, etc., as described in conjunction with FIGS. 1-2B.

The ETL system 106 will, in the context of FIG. 4, be complete in processing at least a portion of an audit log 116 to create aggregation table 118. For example, the process 400 may occur upon the CDC reader 114 reaching EOB 212, to allow for subsequent processing of the aggregation table.

In the example shown, the method 400 can include performing one or more reordering operations on the aggregation table 118, at stage 408. In example implementations, the reordering of the aggregation table may be performed as based on the participating table of the source database 108 as well as the time stamp associated with the given update. In example embodiments, the aggregation table 118 may be reordered to ensure that any updates are processed that would be required for specific foreign key dependencies to be preserved. For example, tables that do not have any dependencies (e.g., no foreign keys) can be processed first, and therefore placed earlier in the aggregation table. Subsequently, tables with only a single set of dependencies could be processed, and so on.

In the example shown, the method 400 further includes providing table records of the aggregation table 118 to ETL process 120, at stage 412. The table records are provided in the reordered arrangement, and the ETL process 120 formats those records for ingestion by the target database 110. The ETL process 120 may then export those table entries, for example via transmission services 122.

If a table or portion of table is not successfully exported at operation 416, the aggregation table may be recovered at a recovery point as seen at operation 420. This can include, for example, recovery of the aggregation table at a certain point in time that depends on an in memory or persistence feature available for that aggregation table. For example, images of the records in a stored version of the aggregation table may be compared to the value of records in the target database 110 to determine whether those records have successfully been updated in the target database 110. Of course, other approaches for comparison of the aggregation table to the target database may be used to preserve data record coherence between databases 106, 110.

Once records in the aggregation table are exported to the remote system 104, changes to the target database changes to the target database may be applied based on the last event occurring on a given record. For example, if an insert operation is performed on a particular record while the original version of that record may be blank, a subsequent image may be fully updated. If an update operation is performed on the particular record, updated version of the record may be modified relative to the original version, based on the changes in the source database 108. A record deletion operation in the aggregation table may result in a record present in the target database also beginning deleted, based on a record of a deletion event present in the audit log 116, propagated to the aggregation table 118, and affected through the ETL process 120 and subsequent transmission services 122.

In effect, in many instances, a last operation on a particular record in the source database 108 may be the only transaction that is required to be propagated to the target database 110. For example, in the event of the deletion operation, no earlier updates would be required to be propagated to the target database, since a last transaction affecting the record would override any such earlier updates by deleting the record (as described above). Furthermore, an insert record transaction in the source database 108 followed by an update record transaction may be propagated to the target database 110 as an insert of the updated record, which would be reflected in the change to the data stored in the aggregation table 118. Various other database transactions, and associated aggregations of such transactions, are understood as within the scope of the present disclosure.

As noted above, in an example observed scenario in which bank records are synchronized between a source database and a remote target database, a synchronization of 600,000 record update events spread across 200,000 distinct records required 28 minutes to perform. In accordance with the present disclosure, because only 200,000 distinct records are updated, there are one third the number of required update events to be transmitted to a target database. Furthermore, because in some scenarios more updates are performed to a smaller set of records, further efficiencies may be achieved. However in the example described, the amount of time required to propagate changes between databases was reduced by half or more, in some instances down to eight minutes to perform the entire set of updates. While this is in some sense data set dependent, it is particularly useful in circumstances where database transactions are frequently performed on a same, relatively small subset of database records.

Figure 5:
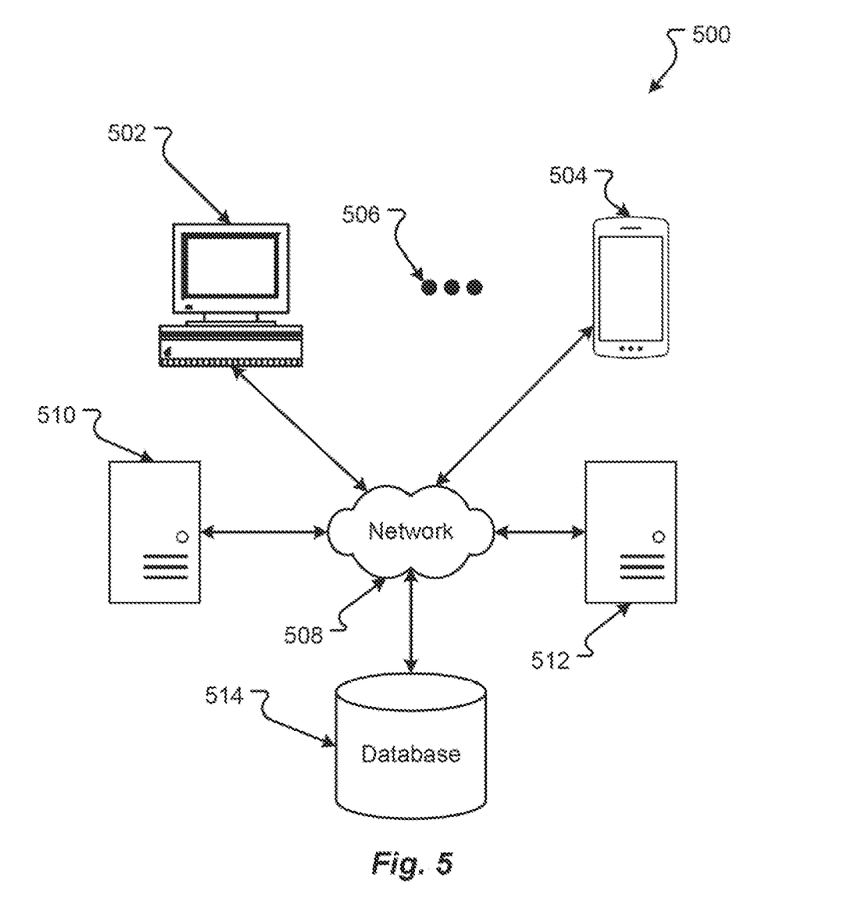
FIG. 5 depicts a computing environment that may function as a server, user computer, or other system provided and described herein, in accordance with embodiments of the present disclosure.

FIG. 5 is a block diagram of an embodiment of a computing environment 500 of the system 100 in accordance with aspects of the present disclosure. The computing environment 500 may include one or more components, servers, databases, computers, computing systems, etc. These associated components may be electrically and/or communicatively coupled to one another via at least one bus or other interconnection. In some configurations, the one or more associated components may send and/or receive signals across a communication network 508 to a separate entity, for example, another server.

The computing system(s), computers, servers, etc. can include any hardware and/or software to conduct operations, as described herein, in accordance with aspects of the present disclosure. The computing system(s), computers, servers, etc. may be as described in conjunction with FIGS. 5 and 6. Interconnected to the computing system(s), computers, servers may be one or more data stores or databases, which are described hereinafter.

Interactions with the computing system(s), computers, servers, etc. may be through an interface and may comprise any type of known communication medium or collection of communication media and may use any type of protocols, such as SIP, TCP/IP, SNA, IPX, AppleTalk, and the like, to transport messages between the computing system(s), computers, servers, etc. and the interface and then translate those messages for transmission onto a bus or otherwise. The interface may include wired and/or wireless communication technologies. Other examples of the interface may include, without limitation, a Local Area Network (LAN), such as an Ethernet network, a Token-Ring network and/or the like, a Wide Area Network (WAN), a virtual network, including without limitation a virtual private network ("VPN"); an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the interface need not be limited to any one network type, and instead may be comprised of a number of different networks and/or network types. The interface may comprise a number of different communication media such as coaxial cable, copper cable/wire, fiber-optic cable, antennas for transmitting/receiving wireless messages, and combinations thereof.

FIG. 5 shows a computing environment 500 that may function as the servers, user computers, or other systems provided and described herein, in accordance with embodiments of the present disclosure. The computing environment 500 includes one or more user computers, or computing devices, such as a computing device 502, a communication device 504, and/or other devices, as represented by ellipses 506. The devices 502, 504 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 502, 504 may also have any of a variety of applications, including for example, database client and/or server applications, and web browser applications. Alternatively, the computing devices 502, 504 may be any other electronic device, such as a thin-client computer, Internet-enabled mobile telephone, and/or personal digital assistant, capable of communicating via a network 260 and/or displaying and navigating web pages or other types of electronic documents. Although the exemplary computing environment 500 is shown with two computing devices, any number of user computers or computing devices may be supported.

The computing environment 500 may also include one or more servers 510, 512. In this example, server 510 is shown as a web server and server 512 is shown as an application server. The web server 510, which may be used to process requests for web pages or other electronic documents from computing devices 502 and 504. The web server 510 can be running an operating system including any of those discussed above, as well as any commercially-available server operating systems. The web server 510 can also run a variety of server applications, including SIP (Session Initiation Protocol) servers, HTTP(s) servers, FTP servers, CGI servers, database servers, Java servers, and the like. In some instances, the web server 510 may publish operations available operations as one or more web services.

The computing environment 500 may also include one or more file and or/application servers 512, which can, in addition to an operating system, include one or more applications accessible by a client running on one or more of the computing devices 502, 504. The server(s) 512 and/or 510 may be one or more general purpose computers capable of executing programs or scripts in response to the computing devices 502, 504. As one example, the server 510, 512 may execute one or more web applications. The web application may be implemented as one or more scripts or programs written in any programming language, such as Java®, C, C#®, or C++, and/or any scripting language, such as Perl, Python. or TCL, as well as combinations of any programming/scripting languages. The application server(s) 512 may also include database servers, including without limitation those commercially available from Oracle®, Microsoft®, Sybase®, IBM® and the like, which can process requests from database clients running on a computing device 502, 504.

The web pages created by the server 510 and/or 512 may be forwarded to a computing device 502, 504 via a web (file) server 510, 512. Similarly, the web server 510 may be able to receive web page requests, web services invocations, and/or input data from a computing device 502, 504 (e.g., a user computer, etc.) and can forward the web page requests and/or input data to the web (application) server 512. In further embodiments, the server 512 may function as a file server. Although for ease of description, FIG. 5 illustrates a separate web server 510 and file/application server 512, those skilled in the art will recognize that the functions described with respect to servers 504, 512 may be performed by a single server and/or a plurality of specialized servers, depending on implementation-specific needs and parameters. The computer systems 502, 504, web (file) server 510 and/or web (application) server 512 may function as the system, devices, or components described in FIGS. 1-2B.

The computing environment 500 may also include a database 514. The database 514 may reside in a variety of locations. By way of example, database 514 may reside on a storage medium local to (and/or resident in) one or more of the computers 502, 504, 510, 512. Alternatively, it may be remote from any or all of the computers 502, 504, 510, 512, and in communication (e.g., via the network 610) with one or more of these. The database 514 may reside in a storage-area network ("SAN") familiar to those skilled in the art. Similarly, any necessary files for performing the functions attributed to the computers 502, 504, 510, 512 may be stored locally on the respective computer and/or remotely, as appropriate. The database 514 may be a relational database, such as Oracle 20i®, that is adapted to store, update, and retrieve data in response to SQL-formatted commands. Database 514 may represent databases and/or data stores 108 and/or 110.

Figure 6:
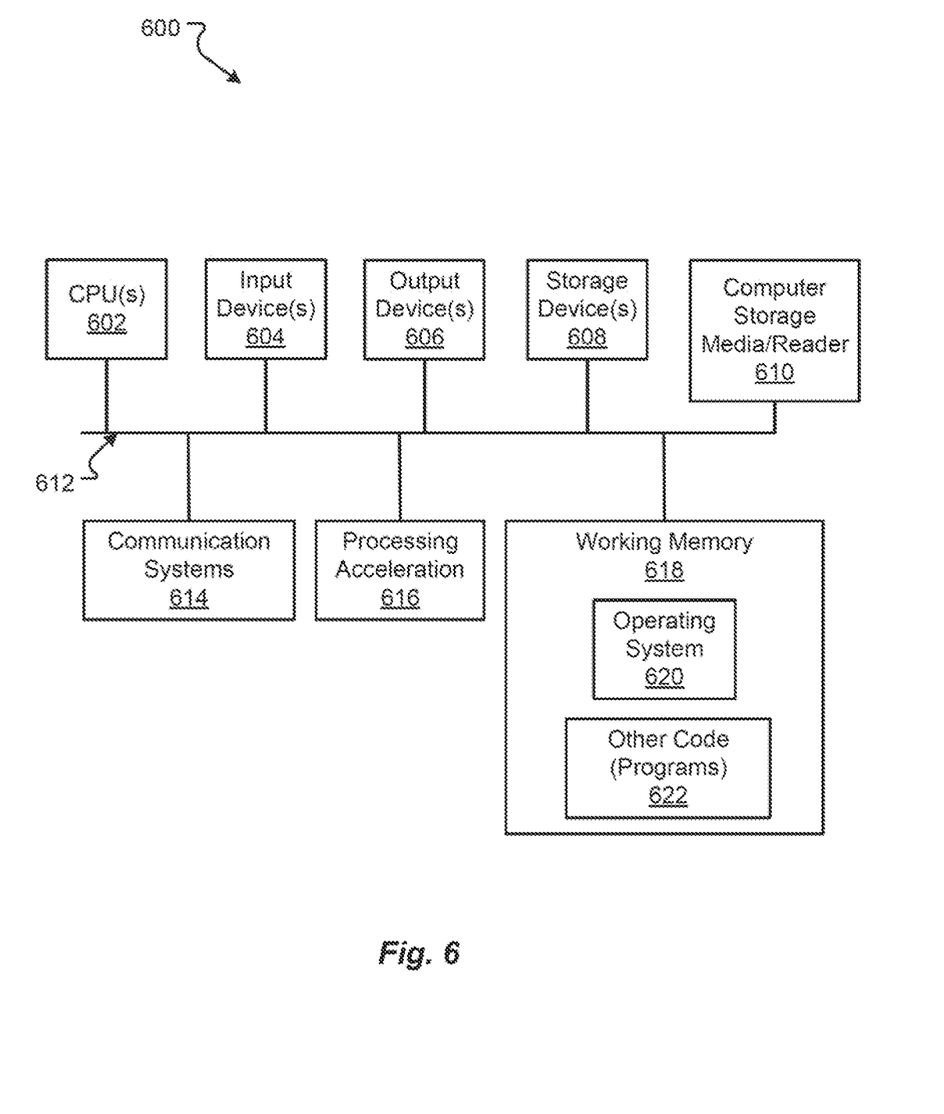
FIG. 6 depicts an example of a computer system upon which a server, computer, computing device, or other system or components may be deployed or executed in accordance with embodiments of the present disclosure.

FIG. 6 illustrates one embodiment of a computer system 600 upon which the servers 510, 512, user computers 502, computing devices, or other systems or components described above may be deployed or executed. The computer system 600 is shown comprising hardware elements that may be electrically coupled via a bus 612. The hardware elements may include one or more central processing units (CPUs) 602; one or more input devices 604 (e.g., a mouse, a keyboard, etc.); and one or more output devices 606 (e.g., a display device, a printer, etc.). The computer system 600 may also include one or more storage devices 608. By way of example, storage device(s) 608 may be disk drives, optical storage devices, solid-state storage devices such as a random access memory ("RAM") and/or a read-only memory ("ROM"), which can be programmable, flash-updateable and/or the like.

The computer system 600 may additionally include a computer-readable storage media/reader 610; a communications system 614 (e.g., a modem, a network card (wireless or wired), an infra-red communication device, etc.); and working memory 618, which may include RAM and ROM devices as described above. The computer system 600 may also include a processing acceleration unit 616, which can include a digital signal processor (DSP), a special-purpose processor, and/or the like.

The computer-readable storage media/reader 610 can further be connected to a computer-readable storage medium, together (and, optionally, in combination with storage device(s) 608) comprehensively representing remote, local, fixed, and/or removable storage devices plus storage media for temporarily and/or more permanently containing computer-readable information. The communications system 614 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 600 may also comprise software elements, shown as being currently located within a working memory 618, including an operating system 620 and/or other code 622. It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 602 as described herein may include, but are not limited to, at least one of Qualcomm® Snapdragon® 888 and 855, Qualcomm® Snapdragon® 620 and 615 with 4G LTE Integration and 64-bit computing, Apple® A7 processor with 64-bit architecture, Apple® M7 motion coprocessors, Samsung® Exynos' series, the Intel® Core® family of processors, the Intel® Xeon® family of processors, the Intel® Atom® family of processors, the Intel Itanium® family of processors, Intel® Core® i5-4670K and i7-4770K 22 nm Haswell, Intel® Core® i5-3570K 22 nm Ivy Bridge, the AMD® FX® family of processors, AMD® FX-4300, FX-6300, and FX-8350 32 nm Vishera, AMD® Kaveri processors, Texas Instruments® Jacinto C6000® automotive infotainment processors, Texas Instruments® OMAP® automotive-grade mobile processors, ARM® Cortex®-M processors, ARM®. Cortex-A and ARM926EJ-S® processors, other industry-equivalent processors, and may perform computational functions using any known or future-developed standard, instruction set, libraries, and/or architecture.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C." "A, B, and/or C," and "A. B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

Examples of the processors as described herein may include, but are not limited to, at least one of Qualcomm® Snapdragon® 800 and 801, Qualcomm® Snapdragon®610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

What is claimed is:

1. A method comprising:
    starting an extract, transform, load (ETL) process for a federated database system, the ETL process used for migrating changes to records in a source database to a target database located remotely from the source database;
    parsing, with a Change Data Capture (CDC) reader, a batch of audit log entries in an audit log, the audit log entries identifying a plurality of changes to a plurality of records in the source database, and the batch being defined by a start of batch (SOB) field and an end of batch (EOB) field;
    aggregating updates to the plurality of database records in an aggregation table that have occurred since a last ETL process, the aggregation table having a single entry for each record of the plurality of database records that is changed by the plurality of changes, and representing less than the entirety of a set of records in a source table of the source database,
    wherein the aggregation table includes, in a same entry of the single entry for a record that is changed by the plurality of changes, an aggregation of two or more updates to a corresponding record in the source database as reflected in two or more audit log entries in the audit log that are consolidated in a single record in the aggregation table, and wherein each audit log entry causes a modification of the single entry for the corresponding record in the a relation table such that the two or more updates appear once in the aggregation table as the single entry including the aggregation of the two or more updates for the record that represents only a last change of the plurality of changes for the record and eliminates previous and intermediary changes; and
    sending, from the aggregation table to the target database, an update of each of the plurality of records without transmitting each of the audit log entries to the target database in the federated database system.

2. The method of claim 1, wherein the audit log comprises two or more of a timestamp, a record identifier (ID), a begin image, an end image, and/or a data manipulation language (DML) operation.

3. The method of claim 2, wherein sending the update includes sending a last update of the one record, the last update being determined based on last timestamp for the record with the record ID.

4. The method of claim 2, further comprising:
    receiving the audit log at the CDC reader;
    creating the aggregation table comprising a plurality of entries, wherein the aggregation table includes an entry for each of the plurality of records identified in the audit log;
    compiling the plurality of changes into the entries; and
    upon reaching an end of batch identifier in the audit log, exporting the contents of the aggregation table to a transform service, the transform service converting the plurality of entries for ingestion at the target database.

5. The method of claim 4, further comprising transmitting transformed, exported contents of the aggregation table to the target database via a network, wherein the target database comprises a remote database.

6. The method of claim 5, further comprising the target database system updating the target database in accordance with the transformed, exported contents of the aggregation table.

7. The method of claim 5, wherein the source database system sends the record ID, the end image, and the DML operation to the ETL service for updating the target database.

8. The method of claim 7, wherein the DML operation comprises one or more of an update, a delete, an insert.

9. The method of claim 8, wherein, when the DML operation is a delete operation, the method further comprising: deleting the record in the target database.

10. The method of claim 9, wherein, when the DML operation is an insert operation, the method further comprising: creating the record in the target database.

11. An ETL system executable local to a source database for communicating updates from the source database to a target database located remotely from the source database in a federated database system, the ETL system comprising:
    a memory storing a Change Data Capture (CDC) reader and an aggregation table;

a processor in communication with the memory, wherein the processor executes instructions stored in the memory, which cause the processor to execute a method, the method comprising:

parsing, with the Change Data Capture (CDC) reader, a batch of audit log entries in an audit log, the audit log entries identifying plurality of changes to a plurality of records in the source database, and the batch being defined by a start of batch (SOB) field and an end of batch (EOB) field;

aggregating updates to the plurality of database records in the aggregation table that have occurred since a last ETL process, the aggregation table having a single entry for each record of the plurality of database records that is changed by the plurality of changes, and representing less than the entirety of a set of records in a source table of the source database, wherein the aggregation table includes, in a same entry of the single entry for a record that is changed by the plurality of changes, an aggregation of two or more updates to a corresponding record in the source database as reflected in two or more audit log entries in the audit log that are consolidated in a single record in the aggregation table, and wherein each audit log entry causes a modification of the single entry for the corresponding record in the aggregation table such that the two or more updates appear once in the aggregation table as the single entry including the aggregation of the two or more updates for the record that represents only a last change of the plurality of changes for the record and eliminates previous and intermediary changes; and sending, from the aggregation table to the target database, an update of each of the plurality of records without transmitting each of the audit log entries to the target database in the federated database system.

12. The ETL system of claim 11, wherein the audit log comprises two or more of a timestamp, a record identifier (ID), a begin image, an end image, and/or a data manipulation language (DML) operation, and wherein sending the update includes sending a last update of the one record, the last update being determined based on last timestamp for the record with the record ID.

13. The ETL system of claim 11, the method further comprising:
comparing the end image to the record in the target database; and
determining changes required by the record in the target database based on the comparison.

14. The ETL system of claim 11, wherein the update comprises: the record ID, the end image, and the DML operation to the target database.

15. The ETL system of claim 11, wherein the DML operation comprising one or more of an update, a delete, an insert.

16. A non-transitory computer readable medium having stored thereon instructions, which when executed by a processor, cause the processor to execute a method, the method comprising:

starting an extract, transform, load (ETL) process for a federated database system, the ETL process used for migrating changes to records in a source database to a target database located remotely from the source database;

parsing, with a Change Data Capture (CDC) reader, a batch of audit log entries in an audit log, the audit log entries identifying a plurality of changes to a plurality of records in the source database, and the batch being defined by a start of batch (SOB) field and an end of batch (EOB) field;

aggregating updates to the plurality of database records in an aggregation table that have occurred since a last ETI process, the aggregation table having a single entry for each record of the plurality of database records that is changed by the plurality of changes, and representing less than the entirety of a set of records in a source table of the source database, wherein the aggregation table includes in a same entry of the single entry for a record that is changed by the plurality of changes, an aggregation of two or more updates to a corresponding record in the source database as reflected in two or more audit log entries in the audit log that are consolidated in a single record in the aggregation table, and wherein each audit log entry causes a modification of the single entry for the corresponding record in the aggregation table such that the two or more updates appear once in the aggregation table as the single entry including the aggregation of the two or more updates for the record that represents only a last change of the plurality of changes for the record and eliminates previous and intermediary changes; and sending, from the aggregation table to the target database, an update of each of the plurality of records without transmitting each of the audit log entries to the target database in the federated database system.

17. The non-transitory computer readable medium of claim 16, wherein the audit log comprises two or more of a timestamp, a record identifier (ID), a begin image, an end image, and/or a data manipulation language (DML) operation, and wherein sending the update includes sending a last update of the one record, the last update being determined based on last timestamp for the record with the record ID.

18. The non-transitory computer readable medium of claim 17, wherein determining the last update is based on last timestamp for the record with the record ID.

19. The non-transitory computer readable medium of claim 17, wherein the last update sent to the target database comprises the record ID, the end image, and the DML operation.

* * * * *